US008384768B2

(12) United States Patent
Link

(10) Patent No.: US 8,384,768 B2
(45) Date of Patent: Feb. 26, 2013

(54) PASS-THROUGH COMPARTMENT FOR PERSONS AND METHOD FOR MONITORING A SPATIAL VOLUME ENCLOSED BY A PASS-THROUGH COMPARTMENT FOR PERSONS

(75) Inventor: Norbert Link, Karlsruhe (DE)

(73) Assignee: Vitracom AG, Karlsruhe (DE)

( * ) Notice: Subject to any disclaimer, the term of this patent is extended or adjusted under 35 U.S.C. 154(b) by 886 days.

(21) Appl. No.: 12/311,924

(22) PCT Filed: Oct. 24, 2007

(86) PCT No.: PCT/DE2007/001894
§ 371 (c)(1),
(2), (4) Date: Apr. 17, 2009

(87) PCT Pub. No.: WO2008/049404
PCT Pub. Date: May 2, 2008

(65) Prior Publication Data
US 2010/0026786 A1 Feb. 4, 2010

(30) Foreign Application Priority Data

Oct. 25, 2006 (DE) .......................... 10 2006 050 379

(51) Int. Cl.
*H04N 13/02* (2006.01)
*H04N 17/02* (2006.01)
(52) U.S. Cl. ......................................... 348/47; 348/187
(58) Field of Classification Search .................... None
See application file for complete search history.

(56) References Cited

U.S. PATENT DOCUMENTS

| 4,402,053 | A | * | 8/1983 | Kelley et al. .................. 700/259 |
| 5,581,625 | A | * | 12/1996 | Connell ........................ 382/100 |
| 5,926,518 | A | * | 7/1999 | Asokawa .......................... 377/6 |
| 6,088,612 | A | * | 7/2000 | Blair ............................ 600/407 |
| 6,606,404 | B1 | * | 8/2003 | Zhang et al. .................. 382/154 |
| 6,720,874 | B2 | * | 4/2004 | Fufido et al. .................. 340/541 |
| 7,058,204 | B2 | * | 6/2006 | Hildreth et al. ............... 382/103 |
| 7,167,576 | B2 | * | 1/2007 | Steenburgh et al. .......... 382/103 |
| 7,200,266 | B2 | * | 4/2007 | Ozer et al. .................... 382/173 |

(Continued)

FOREIGN PATENT DOCUMENTS

| DE | 197 32 153 | 2/1998 |
| EP | 1 524 866 | 4/2005 |

(Continued)

OTHER PUBLICATIONS

International Search Report in German dated Apr. 8, 2009 in PCT/DE2007/001894.

*Primary Examiner* — Jerry Dennison
(74) *Attorney, Agent, or Firm* — Collard & Roe, P.C.

(57) ABSTRACT

It is customary to produce a three-dimensional image using a camera pair in order to ensure that people are isolated in a lock for separating people and to check that no more than one person at a time passes through the lock for separating people. It is an object of the invention to improve known systems and to accelerate them. To this end, a plurality of camera pairs are used according to the invention, which monitor a spatial volume which is to be monitored from several spatial directions at the same time. To this end, each camera pair monitors the space, determines a height profile and supplements shadowed points in the height profile with data of other camera pairs. Monitoring of a spatial volume, for example a passage lock.

6 Claims, 3 Drawing Sheets

U.S. PATENT DOCUMENTS

Figure 1:
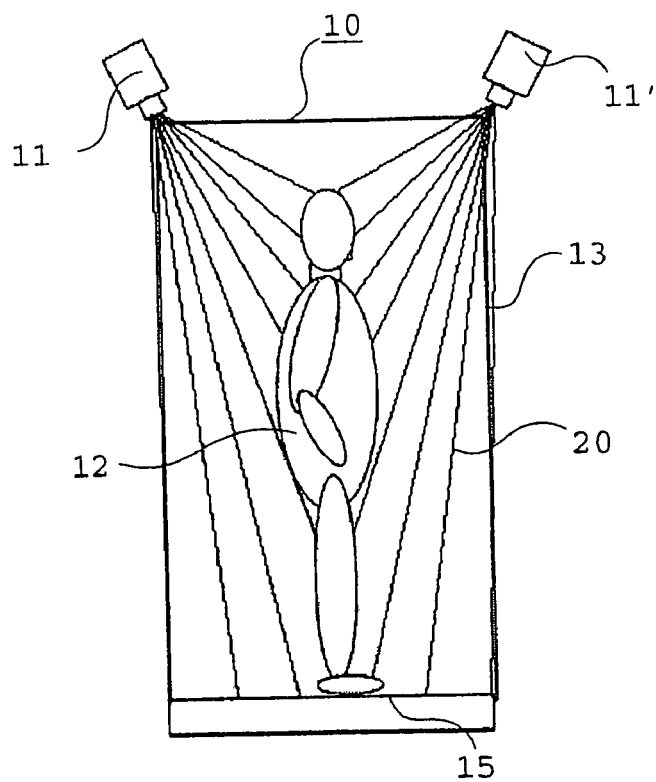

| | | | |
|---|---|---|---|
| 7,382,895 B2* | 6/2008 | Bramblet et al. | 382/103 |
| 7,444,013 B2* | 10/2008 | Chen | 382/154 |
| 7,468,747 B2* | 12/2008 | Nakamura et al. | 348/239 |
| 7,496,226 B2* | 2/2009 | Negahdaripour et al. | 382/154 |
| 7,623,674 B2* | 11/2009 | Nichani et al. | 382/103 |
| 7,688,349 B2* | 3/2010 | Flickner et al. | 348/150 |
| 7,777,783 B1* | 8/2010 | Chin et al. | 348/211.99 |
| 7,949,486 B2* | 5/2011 | Denny et al. | 702/94 |
| 2002/0057345 A1* | 5/2002 | Tamaki et al. | 348/207 |
| 2002/0067259 A1* | 6/2002 | Fufidio et al. | 340/541 |
| 2003/0002712 A1* | 1/2003 | Steenburgh et al. | 382/103 |
| 2003/0058111 A1* | 3/2003 | Lee et al. | 340/573.1 |
| 2003/0107649 A1* | 6/2003 | Flickner et al. | 348/150 |
| 2003/0202691 A1* | 10/2003 | Beardsley | 382/154 |
| 2004/0017929 A1* | 1/2004 | Bramblet et al. | 382/103 |
| 2004/0071367 A1* | 4/2004 | Irani et al. | 382/284 |
| 2005/0104960 A1* | 5/2005 | Han et al. | 348/143 |
| 2005/0135670 A1* | 6/2005 | Vaidyanathan | 382/154 |
| 2005/0169543 A1* | 8/2005 | Damera-Venkata | 382/236 |
| 2005/0237390 A1* | 10/2005 | Mittal et al. | 348/169 |
| 2005/0249382 A1* | 11/2005 | Schwab et al. | 382/115 |
| 2005/0270375 A1* | 12/2005 | Poulin et al. | 348/187 |
| 2007/0047837 A1* | 3/2007 | Schwab et al. | 382/285 |
| 2007/0098253 A1* | 5/2007 | Crespi et al. | 382/159 |
| 2007/0127787 A1* | 6/2007 | Castleman et al. | 382/118 |
| 2007/0127816 A1* | 6/2007 | Balslev et al. | 382/181 |
| 2007/0268145 A1* | 11/2007 | Bazakos et al. | 340/573.1 |
| 2008/0285802 A1* | 11/2008 | Bramblet et al. | 382/103 |
| 2008/0303906 A1* | 12/2008 | Poulin et al. | 348/187 |
| 2010/0026786 A1* | 2/2010 | Link | 348/47 |
| 2010/0141502 A1* | 6/2010 | Cardiasmenos et al. | 342/22 |
| 2010/0141775 A1* | 6/2010 | Vogel | 348/187 |
| 2010/0259539 A1* | 10/2010 | Papanikolopoulos et al. | 345/420 |

FOREIGN PATENT DOCUMENTS

| | | |
|---|---|---|
| WO | WO 81/01213 | 4/1981 |
| WO | WO 2005/048200 | 5/2005 |

* cited by examiner

US 8,384,768 B2

PASS-THROUGH COMPARTMENT FOR PERSONS AND METHOD FOR MONITORING A SPATIAL VOLUME ENCLOSED BY A PASS-THROUGH COMPARTMENT FOR PERSONS

CROSS REFERENCE TO RELATED APPLICATIONS

This application is the National Stage of PCT/DE2007/001894filed on Oct. 24, 2007, which claims priority under 35 U.S.C. §119 of German Application No. 10 2006 050 379.1 filed on Oct. 25, 2006. The international application under PCT article 21(2) was not published in English.

The invention relates to a pass-through compartment for persons, which encloses a spatial volume to be monitored, comprising a plurality of cameras, whereby the cameras are disposed in pairs above the spatial volume to be monitored and are connected to computer hardware, which is able to digitalize camera images detected using the cameras and to calculate, in each instance, a three-dimensional spatial image by means of superimposing the camera images of one camera pair, in each instance, as well as a method for monitoring a spatial volume enclosed by a pass-through compartment for persons.

A corresponding method is already previously known from US 2005/0249382 A1. The American patent mentioned refers to a pass-through compartment that comprises an outer door and an inner door. An area to be monitored is provided within the pass-through compartment, in the area of the two doors, in each instance, whereby each of these areas is monitored by a pair of cameras. Each of the said camera pairs has the area it is supposed to monitor in its sight field, and is capable of calculating a three-dimensional model of the area it is supposed to monitor. To monitor passage through the pass-through compartment, first of all, a check is made to determine whether a person is situated in the area in front of the outer door that is to be monitored. As soon as this is the case, a check is simultaneously made to determine whether, again, a person is situated in the area in front of the inner door that is to be monitored. Accordingly, during entry operation, the outer door is only released for opening if there are no persons in the areas to be monitored; the inner door, which leads to the area that is to be secured, is only released for opening if there is precisely one person situated in the area to be monitored.

Using the camera pairs, two two-dimensional images of the areas to be monitored are produced, in each instance, by means of which images the elements situated in the area can be determined by means of determining three-dimensional spatial points. Subsequently, it is determined, by means of a comparison of the three-dimensional elements determined in this manner with models previously stored in memory, whether a person is situated in the area to be monitored.

The method described above is essentially based on monitoring two separate areas using three-dimensional image detection systems, and being able to control the doors of the pass-through compartment implemented in this manner using the appropriate data. The essential sense of the method primarily consists in avoiding that the secured side of the pass-through compartment, after it has been released for a person, is actually simultaneously entered by several persons. A second person who enters "piggyback" with a first person is supposed to be recognized in advance, on the basis of the three-dimensional image that has been created. For this purpose, placement of the camera pairs, in each instance, is provided in the region above the doors of the pass-through compartment, so that a second person standing behind a first person, for example, can be detected by the camera pair at the same time.

Despite this advantageous arrangement, however, there continue to be spatial points in the shadow area behind the first person, which cannot be seen by the camera pair, in each instance. However, there can also be elements situated in this area that should be detected by the monitoring system, in advantageous manner.

Furthermore, the calculation of three-dimensional models from the superimposition of multiple three-dimensional images of a camera pair represents a very great challenge for the computer hardware provided for this purpose, and with regard to the production of a pass-through compartment implemented in this manner, this represents a significant cost point.

Against this background, the present invention is based on the task of creating a pass-through compartment for persons as well as a method for monitoring a spatial volume enclosed by a pass-through compartment for persons, by means of which monitoring of the spatial volume is further improved, and despite these improved results, can be technically simplified.

This task is accomplished by means of a pass-through compartment for persons, in accordance with the characteristics of the main claim, as well as a method for monitoring a spatial volume enclosed by a pass-through compartment for persons, in accordance with the characteristics of a supplementary claim. Further embodiments of the device and of the method can be derived from the dependent claims, in each instance.

According to the invention, at least two pairs of cameras are disposed above a spatial volume to be monitored, whose sight field covers the spatial area to be monitored, at least to a great extent. In this connection, it is possible to dispose the two camera pairs to lie opposite one another, so that the spatial area to be monitored can still be viewed, to the greatest possible extent, even after an object has been brought in, or after a person has entered, and the sight shadow that results from this is cast. Accordingly, placement of three or four camera pairs, for example, for monitoring a spatial area is possible, whereby in particular, a uniform distribution of these camera pairs certainly appears practical. Each of the cameras yields an individual camera image, whereby the images of a camera pair, in each instance, can be combined into a stereo image, in such a manner that a three-dimensional spatial image is obtained. Using each of these three-dimensional images, a height profile of the spatial area to be monitored can be produced, whereby points on an image that cannot be recognized because a shadow is cast can be supplemented with points that lie in the sight field of other camera pairs. Because of this superimposition of different spatial images, an extensively complete height profile of the area to be monitored is obtained, with which models from a model library can then be compared. After it was possible to fit a model into the height profile that has been produced, an attempt is subsequently made to fit additional models into any remaining areas of the profile. Only once the height profile has been completely filled, at least to the greatest possible extent, is the recognition process complete. On the basis of the models used, conclusions can now be drawn as to how many persons and/or objects are present in the area to be monitored.

It is advantageous if the camera pairs are disposed above the spatial volume to be monitored, or at least in its upper area, so that any objects present in the spatial area to be monitored are at the greatest possible distance from the camera pairs.

Furthermore, a more suitable sight angle can be assumed from an elevated position, which angle essentially contains the spatial area to be monitored.

The spatial volume to be monitored can be spatially limited, at least on one side, for example by means of a barrier or a wall, so that in this way, positioning of the objects present in the spatial area to be monitored is simplified. If positioning of the said objects could be completely freely selected, a significantly greater area would have to be monitored. Also, an area to be monitored could be easily delimited by means of corresponding markings, for example by markings drawn on the floor.

It is particularly advantageous if such delimitations coincide, at least on one side, with the limits of the sight region of the cameras, at least to a great extent. Vice versa, this means that the sight regions of the cameras end, at least on one side, at the limits of the space to be monitored. In this way, it is guaranteed that the cameras have to process as little redundant data as possible, for example data concerning the wall of the spatial area or objects lying outside of the area to be monitored. Also, it is advantageous if at least on one side, a spatial limitation that lies opposite the camera pair is intersected by the sight limit above a head height that can be predetermined. In this way, the result is supposed to be brought about that even very tall persons who enter into the spatial area to be monitored are still completely detected by the cameras, even if they are standing directly at an outer limitation of the area, in the most disadvantageous case.

In an advantageous further development of this device, the sight beams of the individual cameras are deflected, using at least one mirror arrangement, in such a manner that the camera pairs have the sight field described above, despite an indirect orientation. Accordingly, it is made possible, by means of such a mirror arrangement, to dispose the cameras at least approximately horizontally above the spatial volume to be monitored, so that a particularly flat construction form is achieved. As a result, the longitudinal axis of the cameras runs horizontally, to a great extent, while in the case of direct orientation towards the object, it would have to be affixed vertically, to a great extent.

It is particularly advantageous if computer hardware and/or computer software is assigned to the device described above, by means of which digitalization of the camera data can be carried out. Subsequently, the three-dimensional spatial images, on the basis of which the determination of a height profile can be carried out, can be calculated on the basis of these digitalized data.

It is advantageous if the assembly described above is assigned to a pass-through compartment for persons, in such a manner that persons and/or objects situated within the compartment region can be detected and recognized using the camera data. A decision can be reached, on the basis of the comparison of the height profile that is created with models from a model library, as to whether only one or actually several persons are passing through the pass-through compartment for persons, so that any separation of persons that might be necessary can be supported by the device according to the invention.

For calibrating the camera pairs, in each instance, which are used to monitor the spatial volume, it is provided, according to the invention, to first undertake a laboratory calibration of the internal imaging parameters. As internal imaging parameters, the method merely requires the calibrated focal length and the radial lens distortion. The individual cameras are first put through this laboratory calibration, and after calibration, they are combined, in pairs, into pairs of cameras. On site, in other words after the camera pairs have been affixed to a spatial area to be monitored, a homography is first determined for each of the cameras, in order to calibrate the external orientation of the camera pair, which homography represents imaging of the image points recorded by the camera on a reference plane. The reference plane is selected in suitable manner, in the space to be monitored. This step is carried out analogously for a second reference plane, which preferably lies parallel to the first. As a last calibration step, an epipolar geometry is created for each camera pair; it can be used to assign a height value to each spatial point covered by the camera.

Within the scope of this calibration, the camera to be calibrated is set up, with reference to a calibration body, preferably a square grid, in such a manner that this square grid is disposed in planar manner in front of the camera, in each instance. Using the calibration body, a positive or a negative distortion is determined, whereby the center of the radial distortion, or warp, is determined using the Lenz model. To determine the calibrated focal length, the square grid is set up at a defined distance in front of the camera, which has already been corrected with regard to radial distortion. According to the intercept theorem, the calibrated focal length c is then calculated as follows:

$$r\delta/R = -c/D$$

whereby R is the distance of a grid point from the grid center, r is the distance of the corresponding camera image point from the camera image center, $\delta$ is the physical distance between two camera image points, and D is the distance of the optical center of the camera from the calibration body.

In a next step, the camera pairs are disposed on location and pre-calibrated once again. This first on-site calibration first of all requires the introduction of a reference plane, as well as an ancillary plane that preferably lies parallel to the reference plane. The reference plane is preferably determined by means of an arrangement of markings situated at a right angle to one another, whose positions in space are previously known. An imaging regulation for imaging the reference plane on the cameras, in each instance, what is called a homography, is determined by means of a comparison of the camera images with the real arrangement on the reference plane. Such a homography is determined for both cameras of each camera pair. The parameter values of the homographies obtained in this manner are stored in memory for use in the evaluation cycle of the current camera images, in each instance.

Finally, an epipolar geometry is additionally established for each camera pair, which is made possible by warping the camera image onto the reference plane, in each instance. If any desired point in space is being considered, the image points of the cameras, in each instance, lie on a line of the reference plane, with regard to this spatial point. These lines are called epipolar lines, and the coordinates of the homologous points of the two images are determined along the epipolar lines, using the standardized cross-correlation functions as a measure of similarity.

It is advantageous if the floor surface of the spatial volume to be monitored is defined as the reference plane.

A calibrated camera pair participates in the method for monitoring a spatial volume, according to the invention. For this purpose, a plurality of such camera pairs is disposed in the area of a spatial volume to be monitored, in such a manner that the spatial volume to be monitored is viewed from different spatial directions by the different cameras. The three-dimensional spatial images of each camera pair are evaluated together, in such a manner that spatial points that cannot be shown due to shadows that are cast are supplemented using spatial images of other camera pairs, in each instance.

For handling the video data, in each instance, the video data streams coming from the individual cameras are digitalized, and passed to corresponding computer hardware and/or computer software.

The camera images of the individual cameras are corrected on the basis of calibration data; only the camera images corrected in this manner are used as the basis of further calculation. In this connection, the further calculation provides for creating a three-dimensional spatial image of the sight region of the camera pair, in each instance, and afterwards, a height value is calculated for every spatial point, and a height profile of the monitored space is determined in this manner.

It is advantageous to bring the height profile into relation with the reference plane, whereby the individual spatial points are calculated using homographies and straight-line intersections in space. For a faster calculation of the said height profile, the epipolar geometry between two images is produced by means of homographic imaging of the two images of a camera pair onto the reference plane; in this way, homologous image points, in other words image points that belong to the same spatial point, lie on the same epipolar line of the camera images. The height value is then determined by means of the intersection of two straight lines of the same spatial point, which result from the penetration points of the sight beams through the ancillary plane. Using a second homography, in each instance, namely between a camera image and the ancillary plane, in each instance, the homologous points found are transformed onto the ancillary plane. The intersection of the two sight beams of the camera images, which penetrate a camera image point and the corresponding point on the ancillary plane, in each instance, corresponds to the spatial point being sought.

Because it is possible that not all the imaging errors or numerical errors can be taken into consideration in the determination of the homographies, the sight beams will not have a common intersection, in practical situations. Instead, the two sight beams of a camera pair will lie out of square in space relative to one another, and this makes an estimation of the spatial position of the spatial point being sought necessary. For this purpose, the distance between the two sight beams is determined, and the center point of the distance segment between the two sight beams is assumed to be the point sought.

Subsequent to the determination of the height profile consisting of the height values of the individual spatial points obtained in this manner, this profile is compared with the standard models stored in the model library. These standard models are inserted into the height profile, and a check is carried out to determine whether the height profile corresponds to at least one of the predetermined models. If this is the case, the object that corresponds to the model is considered to have been recognized. In an advantageous further development of this method, a check subsequently takes place to determine whether additional standard models can be inserted into the remaining space of the height profile. In the concrete application, for example as a pass-through compartment for separating persons, this application could be expanded to the effect that if more than one object is recognized, an alarm is triggered, or the pass-through compartment is closed.

The invention described above will be explained in greater detail below, using an exemplary embodiment that is shown in the drawing.

Figure 2:
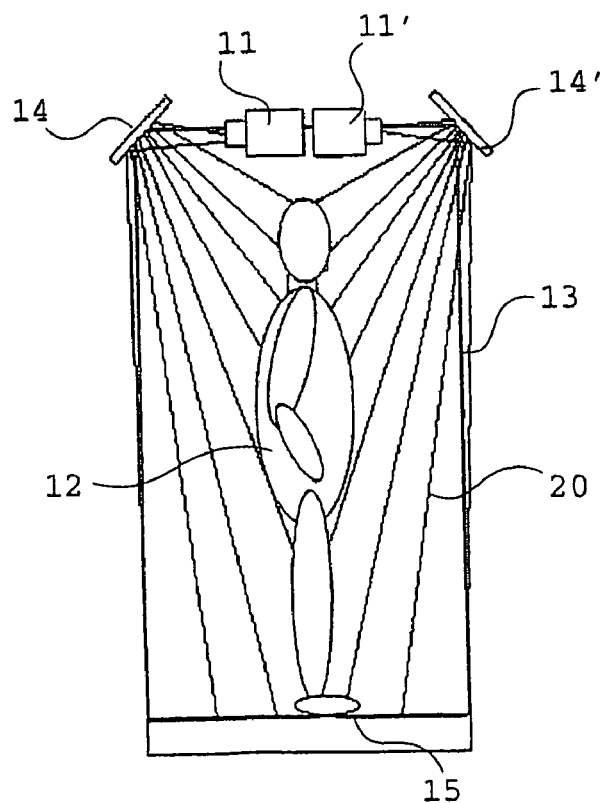
Figure 3:
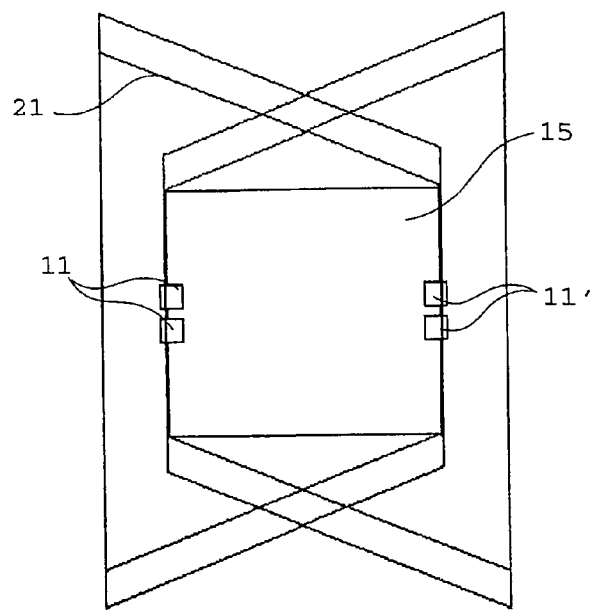
Figure 4:
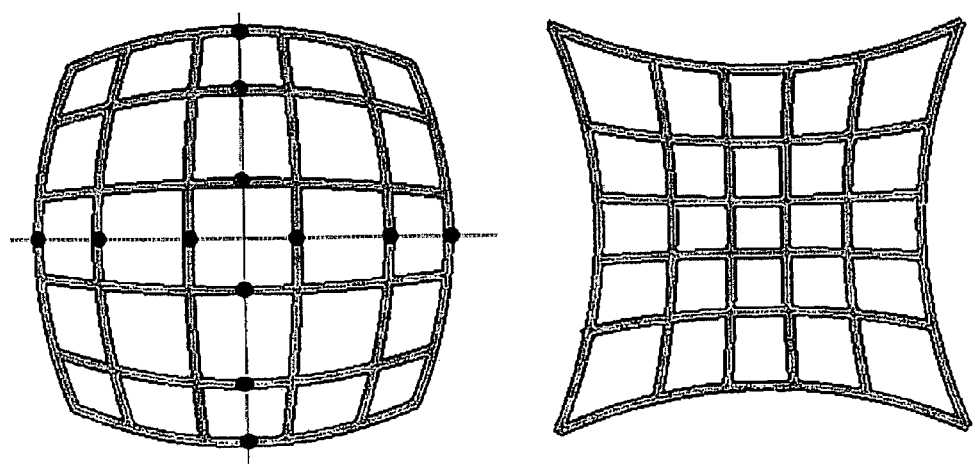
Figure 5:
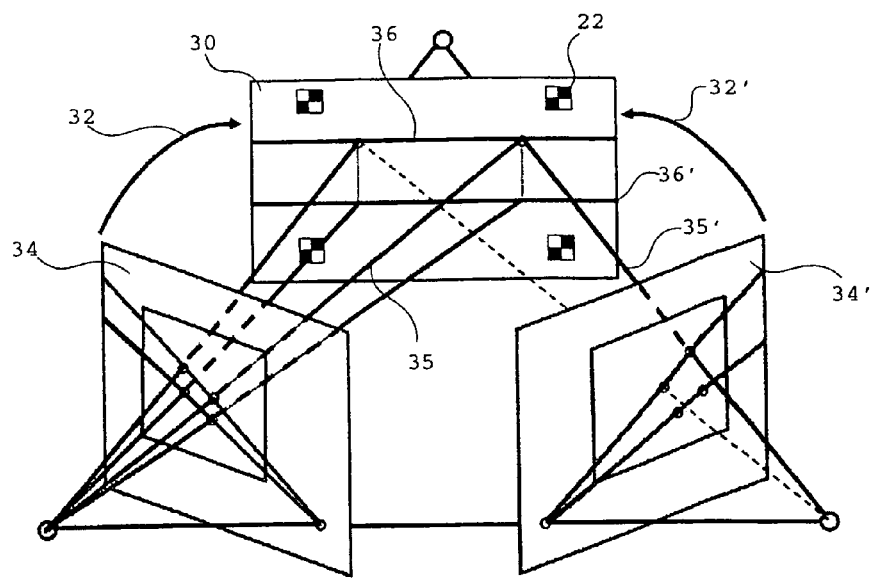
Figure 6:
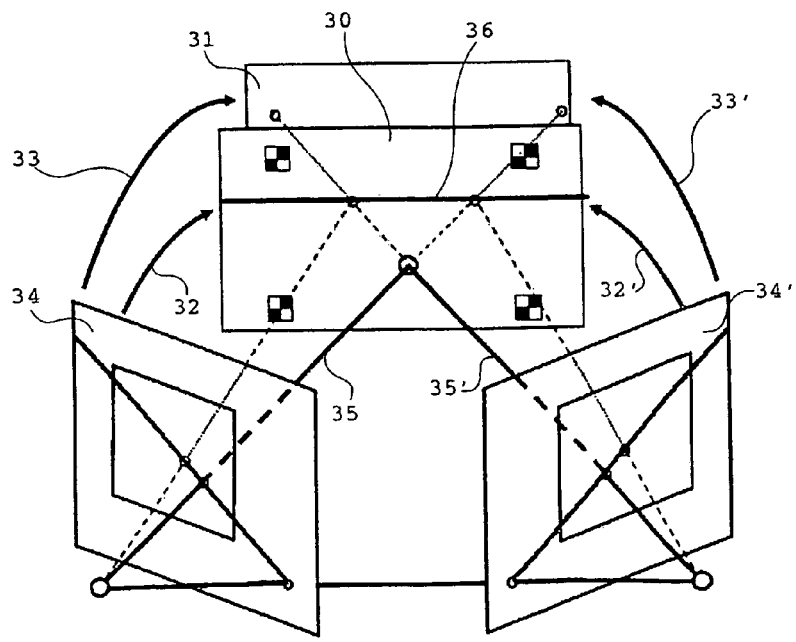

This shows:

FIG. 1 a device according to the invention, having a limited spatial volume to be monitored, in a sectional representation, from the side, FIG. 2 the device according to FIG. 1, having a mirror arrangement and camera pairs disposed horizontally, in a sectional representation, from the side, FIG. 3 a projection of the sight fields of two camera pairs that lie opposite one another, onto the floor of a spatial area to be monitored, FIG. 4 a representation of a square grid with a cushion-shaped and barrel-shaped distortion, respectively, FIG. 5 a representation of the placement of two camera images with regard to a reference plane, for calibrating a camera pair, and FIG. 6 a representation of the placement of two camera images with regard to a reference plane, as well as an ancillary plane, for calculating the position of a spatial point.

FIG. 1 shows a spatial volume 10 to be monitored, which is monitored by two camera pairs 11, 11'. The two cameras of a camera pair 11, 11', in each instance, which lie behind one another in the figure, are inclined in such a manner that the outermost sight beams 20 of the camera pairs 11, 11' run at least essentially parallel to the wall 13 that lies closer, in the region of this wall, or run along this wall, and intersect the wall 13 in the region of the opposite wall 13, at a height that is greater than the head height of a person 12 situated in the spatial volume 10 to be monitored, for example. The placement of camera pairs 11, 11' that lie opposite one another guarantees that no additional object, or no further person 12, respectively, can be situated in the area on which the person 12 casts a shadow. If this were the case, then this object, i.e. this person 12 could be detected by the second camera pair 11, 11', which views the spatial volume 10 to be monitored from a different sight angle. Each camera pair 11, 11' disposed in the region of the spatial volume 10 to be monitored produces a three-dimensional spatial image, using which a height profile of the spatial volume 10 to be monitored can be determined. If the spatial points of the spatial volume 10 cannot be detected by a camera pair 11, 11', recourse is taken to the three-dimensional spatial image made available by the other camera pair 11, 11', for the spatial points that cannot be seen. The height profile of the spatial volume 10 to be monitored, supplemented in this way, is subsequently compared with standard models that are kept on hand in a model library. Standard models are inserted into the height profile until it can be determined what objects are situated in the spatial volume 10 to be monitored.

FIG. 2 shows a spatial volume 10 to be monitored, having a similar structure, whereby a mirror arrangement 14, 14' is introduced, in each instance, into the light path of the camera pairs 11, 11' that are affixed horizontally there, above the spatial area 10 to be monitored, so that while the same object, namely the person 12, is situated in the sight field of the camera pairs 11, 11', in each instance, the total height of the arrangement is reduced in comparison with the preceding arrangement of the camera pairs 11, 11'. Such a construction is particularly well suited for pass-through compartments that frequently have to be configured with a low construction height, in order to save space. Also, the proposed system, namely supplementing a three-dimensional spatial image by means of a second three-dimensional spatial image from a different spatial direction, is particularly well suited for use in separating persons in the region of a pass-through compartment, since in this manner, more than one person passing through "piggyback" is prevented. As soon as multiple persons 12 are present in such a pass-through compartment, this is recognized by the camera pairs 11, 11', and any processing software or hardware being used will react accordingly.

FIG. 3 shows a projection of the sight fields covered by the individual cameras of the camera pairs 11, 11', onto the floor 15 of the spatial areas 10 to be monitored. It becomes clear that each individual one of the cameras used in the camera pairs 11, 11' covers the complete area of the spatial volume 10, to a great extent. In this way, it is guaranteed that each spatial point, if it possibly cannot be covered by one of the cameras due to casting of a shadow, will very likely still be monitored by at least one other camera.

FIG. 4 shows a square grid for calibrating the individual cameras of a camera pair 11, 11', whereby the calibration of the camera takes place in the laboratory, using the square grid. The square grid is set up vertically in front of the camera to be calibrated, so that the center of the square grid comes to lie in the image center of the camera image. Subsequently, various camera parameters are determined, including the perspective center, the radial distortion, and the calibrated focal length. FIG. 4 shows two possible views of the square grid before calibration, namely the cushion-shaped distortion on the left and the barrel-shaped distortion on the right. By means of calibrating the individual cameras, the result is brought about that the distortion of the individual cameras is compensated in such a manner that the square grid is interpreted as being square, in other words having straight edges, after the error correction.

FIG. 5 shows a placement of the cameras of a camera pair 11, 11' that have already been installed on site and must also undergo further calibration steps in their position as intended for use. For this purpose, first a reference plane 30 is introduced, for example the floor surface 15, with regard to which the height points of the later height profile will be put into reference. During the course of the calibration, first a homography 32, 32' between the camera images 34, 34', in each instance, and the reference plane is determined, in each instance, in that markings 22 are disposed at a defined position on the reference plane 30, and an imaging regulation, namely a homography 32, 32', between camera image 34, 34' and reference plane 30, is determined, by means of a comparison of the reality with the camera image 34, 34'. The homographies 32, 32' calculated in this manner are stored in memory for the subsequent evaluation cycle. In another calibration step, an epipolar geometry is introduced, which is laid onto the reference plane in such a manner that homologous points, in other words corresponding points on the camera images 34, 34' of a camera pair 11, 11', come to lie on an epipolar line 36, 36' of the epipolar geometry system, in each instance. The cross-correlation function is used as a measure of similarity to determine the coordinates of the homologous points, in each instance.

FIG. 6, finally, shows how an evaluation and the creation of a height profile take place, in detail. A spatial point recorded by both cameras of the camera pair 11, 11' is selected, whereby this point lies on a common epipolar line 36 for both cameras. The selected spatial point then lies on a sight beam 35, 35', which penetrates the image point of the camera image 34, 34' and the homography 33, 33' of the camera image on an ancillary plane 31 that is parallel to the reference plane 30. The spatial point being sought is then situated at the intersection of the two sight beams 35, 35'. The height position of the spatial point being sought, with reference to the floor 15, i.e. the reference plane 30 situated there, can consequently be calculated geometrically. By means of a corresponding method of procedure for all the image points recorded by the cameras, a height profile is obtained, which images the objects contained in the spatial volume 10 to be monitored.

Above, a method as well as a device for monitoring a spatial volume, are therefore described, which have the advantage, in use, that complete monitoring of the spatial volume can be guaranteed, while at the same time, a simplified method of procedure for obtaining the three-dimensional data is taught.

REFERENCE SYMBOL LIST

| | |
|---|---|
| 10 | spatial volume |
| 11, 11' | camera pair |
| 12 | person |
| 13 | wall |
| 14, 14' | mirror arrangement |
| 15 | floor surface |
| 20 | sight beams |
| 21 | sight region |
| 22 | marking |
| 30 | reference plane |
| 31 | ancillary plane |
| 32, 32' | homography between camera image and reference plane |
| 33, 33' | homography between camera image and ancillary plane |
| 34, 34' | camera image |
| 35, 35' | sight beams |
| 36, 36' | epipolar lines |
| 40 | positive distortion |
| 41 | negative distortion |

The invention claimed is:

1. Method for monitoring a spatial volume (10) enclosed by a pass-through compartment for persons using a plurality of camera pairs (11, 11') comprising cameras being disposed in pairs above the spatial volume (10), which are oriented from different spatial directions on the spatial volume (10) and are connected to computer hardware for digitalizing camera images (34, 34') detected by means of the cameras and for calculating, in each instance, a three-dimensional spatial image by means of superimposing the camera images (34, 34') of one camera pair (11,11'), in each instance, whereby a three-dimensional spatial image is prepared from the camera images of each one camera pair by means of the computer hardware and a height profile is determined therefrom, and whereby a common height profile being completed in that spatial points that cannot be represented due to shadows cast in one spatial image or height profile are supplemented using spatial images or height profiles of other camera pairs (11, 11').

2. Method according to claim 1, wherein video data streams that come from the individual cameras and/or the camera pairs (11, 11') are digitalized.

3. Method according to claim 1, wherein the height profile is put into relation with a reference plane (30), wherein spatial points are calculated using homographies (32, 32', 33, 33') and straight line intersections in space.

4. Method according to claim 3, wherein the position of individual spatial points is determined as the intersection point of the sight beams (35, 35') of the two cameras of a camera pair (11, 11') to said spatial point, in each instance.

5. Method according to claim 1, wherein the height profile produced is compared with standard models, namely standard height profiles of persons or objects expected in the monitored spatial volume.

6. Method according to claim 5, wherein after recognition of a standard profile, a check is carried out to determine whether another standard model can be inserted into the remaining space.

* * * * *